J. F. K. OTTO.
ENDLESS CHAIN AUTOSLED.
APPLICATION FILED OCT. 7, 1912.
1,068,071.
Patented July 22, 1913.
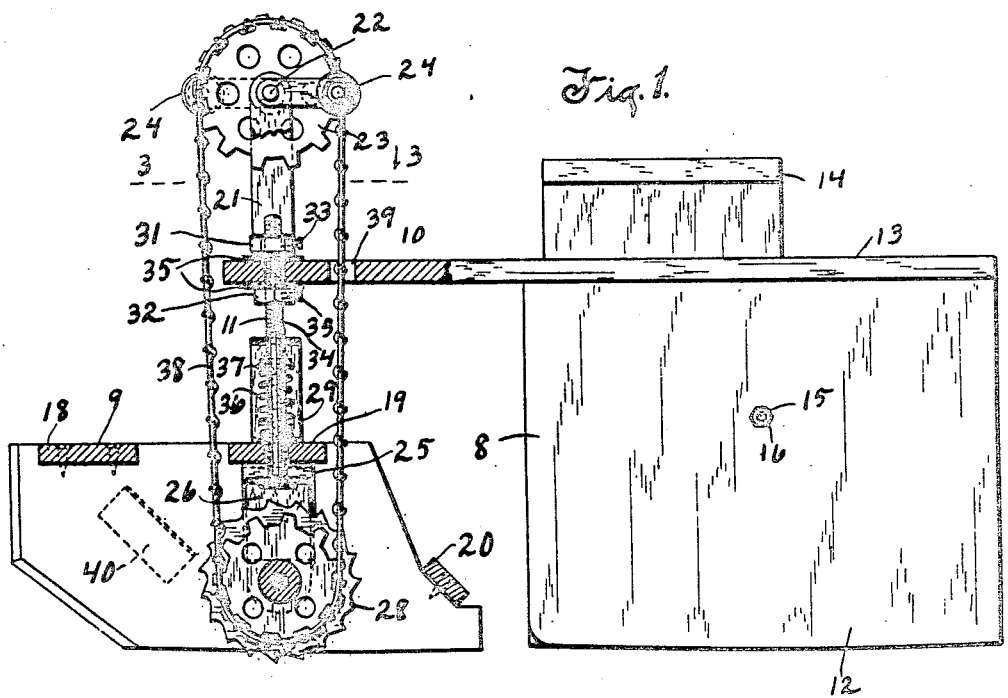
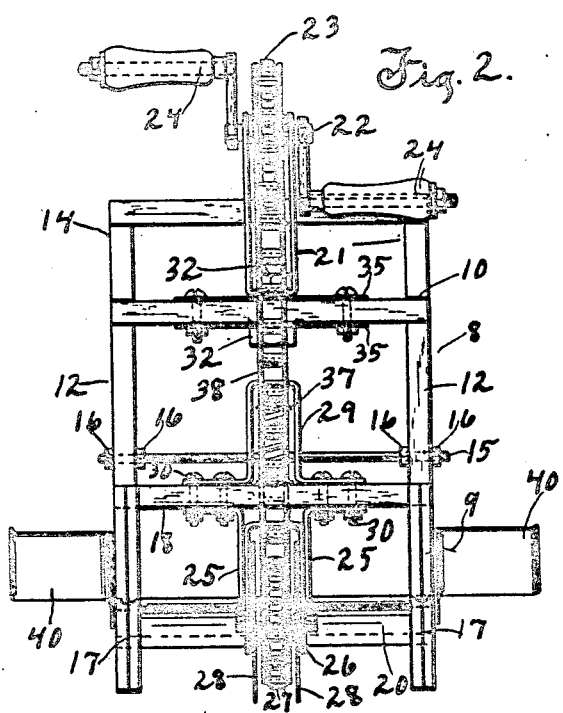
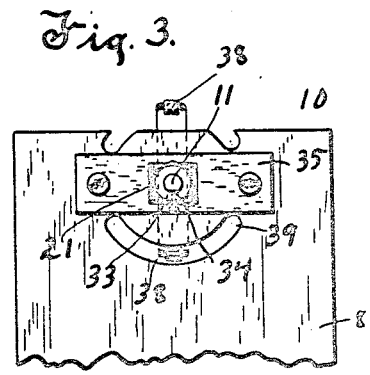
WITNESSES
Arthur F Miller
Katherine Holt
INVENTOR.
Julius F. K. Otto
By Morrell & Caldwell
ATTORNEYS

UNITED STATES PATENT OFFICE.

JULIUS F. K. OTTO, OF MILWAUKEE, WISCONSIN.

ENDLESS-CHAIN AUTOSLED.

1,068,071.  Specification of Letters Patent.  Patented July 22, 1913.

Application filed October 7, 1912. Serial No. 724,290.

*To all whom it may concern:*

Be it known that I, JULIUS F. K. OTTO, a citizen of the United States, and resident of Milwaukee, in the county of Milwaukee and State of Wisconsin, have invented new and useful Improvements in Endless-Chain Autosleds, of which the following is a description, reference being had to the accompanying drawings, which are a part of this specification.

This invention relates to improvements in endless chain auto sleds of the traction type.

It is one of the objects of the present invention to provide an endless chain auto sled of the traction type which may be easily propelled by the user in a very efficient manner.

A further object of the invention is to provide an endless chain auto sled of the before mentioned type which may be easily steered in any direction desired.

A further object of the invention is to provide an endless chain auto sled in which the traction means yieldingly engages the surface traveled over to provide for the inequalities of the said surface.

A further object of the invention is to provide an endless chain auto sled with means for adjusting the tension of the traction means to adapt the sled to surfaces of different character.

With the above and other objects in view, the invention consists of the improved endless chain auto sled and its parts and combinations as set forth in the claims and all equivalents thereof.

In the accompanying drawing in which the same reference characters indicate the same parts in all of the views: Figure 1 is a side view of the improved endless-chain auto sled, parts broken away and other parts being shown in section to show other parts in the rear thereof; Fig. 2 is a front view thereof; and Fig. 3 is a sectional detail view taken on line 3—3 of Fig. 1 of the upper forward end portion of the endless chain auto sled.

Referring to the drawing the numeral 8 indicates the rear section of the endless chain auto sled and 9 the front steering section thereof which is connected to the forwardly projecting portion 10 of the rear section by a steering or king bolt 11. The rear section comprises the side runner boards 12, the top board 13 having the forwardly projecting portion 10 before mentioned and the elevated seat 14 mounted on said top board. A tie rod extending through both side runners and having nuts 16 threaded on the rod on each side of each side runner serves to brace the runners laterally. The steering section is also provided with side runners 17 connected together by upper cross pieces 18 and 19 and by a rear cross piece 20.

A U-shaped standard 21 mounted on the forwardly projecting portion 10 of the rear section has journaled therein transversely of the sled a short shaft 22 upon which is mounted a sprocket wheel 23. Cranked operating handles 24 connected to the opposite ends of the shaft are adapted to be turned to rotate the said sprocket wheel.

Guide members 25 connected to and depending from the lower side of the cross piece 19 have slidably positioned therebetween a lower U-shaped bearing member 26 which carries a sprocket wheel 27 and a toothed traction wheel 28 on each side of and of larger diameter than the said sprocket wheel. A standard 29 is also mounted on the cross piece 19 above the guide members and is connected to the cross piece 19 by screw bolts 30 which also fasten the guide members to said cross piece.

The king bolt 11 is firmly attached to the upper portion of the bearing member 26 and extends upwardly therefrom and through the cross piece 19, the standard 29, the forwardly projecting portion 10 and the U-shaped standard 21. The upper end portion of the king bolt is threaded to take nuts 31 and 32 and these nuts are provided with lock bolts 33 which are threaded through the side portions of the nuts and impinge against a flattened or slabbed portion 34 of the king bolt to lock said nuts in adjusted position. Bearing plates 35 are interposed between the lower lock nut and the top board portion and between the said top board portion and the lower portion of the U-shaped standard 21 to provide for relieving the seat section of wear. The lock nut 31 fits snugly between the stem portions of the U-shaped standard 21 and cannot be turned independently thereof so that when the nut is locked to the king bolt the steering section of the sled may be turned in any direction desired for steering by swinging the U-shaped standard by the cranked handles connected thereto. The lock nuts 31 and 32 also provide for adjusting the height of the steering section with relation to the rear section to cause the traction wheels to dig more or less into the surface traveled over.

In order to permit the steering section of the endless chain auto sled to yield with relation to the rear section and travel over the inequalities of the surface supporting the sled, a coiled spring 36 surrounds the king bolt and is interposed between the cross piece 19 and a collar 37 mounted on the said king bolt. The steering section is free to slide on the king bolt and the spring is not of sufficient strength to prevent the traction wheels from engaging the surface traveled over below the lower edges of the steering section runners.

A sprocket chain 38 engaging the sprocket wheels serves to transmit motion from the upper to the lower sprocket wheel. The forwardly projecting portion of the rear section is provided with a semi-circular slot 39 through which the chain passes to permit said chain to turn with the steering section. The steering section is also provided with foot projections 40 to support the feet of the user and also to assist in steering the section.

In use the operator sits on the seat, places his feet on the foot projections and turns the cranked handles to propel the sled over the surface traveled on. If it is desired to adjust the tension of the chain or the distance of the traction wheels from the forwardly projecting portion of the rear section, the adjustment may be easily made by changing the location of the locking nuts on the king bolt and locking them again in position.

From the foregoing description it will be seen that the endless chain auto sled is of very simple construction, is easily propelled, and may be manufactured at a minimum cost.

What I claim as my invention is:

1. An endless chain auto sled, comprising a rear runner sled section, a steering runner sled section, a king bolt connecting both sections together to permit the steering runner section to be turned at an angle with relation to the other section, a traction wheel carried by the steering section and turnable therewith, and means mounted on the rear section for rotating the traction wheel to propel the sled.

2. An endless chain auto sled, comprising a rear runner sled section, a steering runner sled section, a king bolt connecting the sections together to permit the steering runner section to be turned at an angle with relation to the other runner, a traction wheel carried by the lower end portion of the king bolt and turnable with the steering section, cranked handles mounted on the rear section and turnable with the steering section, and a power transmitting connection between the traction wheel and the cranked handles.

3. An endless chain auto sled, comprising a rear runner sled section having a forwardly projecting portion, a steering runner sled section positioned beneath the projecting portion, a king bolt connecting the two sections together and having a yielding connection with one of the sections, a traction wheel connected to the lower end portion of the king bolt and having a portion extending below the lower edges of the steering section and turnable with the steering section, cranked handles mounted on the forwardly projecting portion of the rear section and turnable with the steering section, and a power transmission means connecting the cranked handles to the traction wheel.

4. An endless chain auto sled, comprising a rear runner sled section having a forwardly projecting portion, a steering runner sled section positioned beneath the projecting portion, a king bolt extending loosely through the steering section and the projecting portion of the rear section to permit the runner section to be turned at an angle with relation to the other section, a standard revolubly positioned on the projecting portion and through which the king bolt extends, means for adjustably connecting the upper end portion of the king bolt to the standard, a sprocket wheel and a traction wheel carried by the standard and having cranked handles for rotating the same and having a sprocket chain connection with the other sprocket wheel, said king bolt provided with a collar, and a coiled spring surrounding the king bolt and interposed between the collar and the steering section.

5. An endless chain auto sled, comprising a rear sled section having a forwardly projecting portion, a steering sled section positioned beneath the projecting portion, a king bolt extending loosely through the steering section and the projecting portion of the rear section, said king bolt provided with a threaded and with a flattened portion, a standard revolubly positioned on the projecting portion and through which the king bolt extends, a nut threaded on the king bolt below the projecting portion of the rear section and another nut threaded on the said bolt and engaging the standard, screws threaded in the nuts for locking the nuts to the flattened portion of the bolt, a sprocket wheel and a pair of traction wheels carried by the lower end portion of the king bolt, a sprocket wheel carried by the standard and having cranked handles for rotating the same, a sprocket chain connection between the two sprocket wheels, depending guide means carried by the steering section for the lower end portion of the king bolt, said king bolt provided with a collar, and a coiled spring surrounding the king bolt and interposed between the collar and the steering section.

In testimony whereof, I affix my signature, in presence of two witnesses.

JULIUS F. K. OTTO.

Witnesses:
JACOB HUNGER,
C. H. KEENEY.

Copies of this patent may be obtained for five cents each, by addressing the "Commissioner of Patents, Washington, D. C."